US008914232B2

(12) United States Patent
Ma et al.

(10) Patent No.: US 8,914,232 B2
(45) Date of Patent: Dec. 16, 2014

(54) SYSTEMS, APPARATUS AND METHODS FOR DELIVERY OF LOCATION-ORIENTED INFORMATION

(75) Inventors: Maran Ma, Waterloo (CA); Janice Cheng, Mississauga (CA); Namratha Rajagopal, Waterloo (CA); Yuan Fang, Brampton (CA)

(73) Assignee: 2238366 Ontario Inc., Waterloo, Onatrio (CA)

( * ) Notice: Subject to any disclaimer, the term of this patent is extended or adjusted under 35 U.S.C. 154(b) by 0 days.

(21) Appl. No.: 13/560,395

(22) Filed: Jul. 27, 2012

(65) Prior Publication Data

US 2012/0296564 A1 Nov. 22, 2012

Related U.S. Application Data

(63) Continuation of application No. 12/358,173, filed on Jan. 22, 2009, now Pat. No. 8,239,132.

(60) Provisional application No. 61/022,677, filed on Jan. 22, 2008.

(51) Int. Cl.
*G01C 21/34* (2006.01)
*G01C 21/36* (2006.01)
*G01C 21/20* (2006.01)

(52) U.S. Cl.
CPC ............ *G01C 21/3679* (2013.01); *G01C 21/20* (2013.01)
USPC ........................................... 701/438; 701/436

(58) Field of Classification Search
USPC ............ 701/28, 409, 426, 428, 431, 436, 438
See application file for complete search history.

(56) References Cited

U.S. PATENT DOCUMENTS

| 5,815,411 | A | 9/1998 | Ellenby et al. |
| 6,285,317 | B1* | 9/2001 | Ong .......................... 342/357.57 |
| 6,765,569 | B2 | 7/2004 | Neumann et al. |
| 6,975,959 | B2* | 12/2005 | Dietrich et al. ............... 702/153 |
| 7,119,831 | B2 | 10/2006 | Ohto et al. |
| 7,236,799 | B2 | 6/2007 | Wilson et al. |
| 7,289,812 | B1 | 10/2007 | Roberts et al. |
| 7,516,421 | B2 | 4/2009 | Asano et al. |
| 7,930,101 | B2* | 4/2011 | Geelen et al. .................. 701/436 |
| 8,239,132 | B2* | 8/2012 | Ma et al. ........................ 701/438 |
| 2003/0060978 | A1 | 3/2003 | Kokojima et al. |
| 2005/0234637 | A1 | 10/2005 | Obradovich et al. |
| 2006/0284791 | A1 | 12/2006 | Chen et al. |

(Continued)

FOREIGN PATENT DOCUMENTS

| CN | 101105505 | 9/2010 |
| KR | 100777215 | 11/2007 |

(Continued)

*Primary Examiner* — Joseph C Rodriguez
(74) *Attorney, Agent, or Firm* — Bereskin & Parr LLP

(57) ABSTRACT

An augmented reality guiding system for delivery of location-oriented information, including a location server, a database coupled to the location server, and at least one mobile locating device. The database is configured to store target information relating to target points of interest. Each mobile locating device has a positioning module, an imaging module, a spatial orientation detection module, a display module, and at least one wireless communication module. Each mobile locating device is configured to receive target information relating to at least one target points of interest from the location server, and display the target information by visually augmenting at least one image on the display module.

20 Claims, 14 Drawing Sheets

(56) References Cited

U.S. PATENT DOCUMENTS

| | | |
|---|---|---|
| 2007/0162942 A1 | 7/2007 | Hamynen et al. |
| 2007/0273644 A1 | 11/2007 | Mondine Natucci |
| 2008/0082254 A1 | 4/2008 | Huhtala et al. |
| 2008/0141772 A1 | 6/2008 | Kahari et al. |
| 2008/0268876 A1 | 10/2008 | Gelfand et al. |
| 2009/0063047 A1* | 3/2009 | Ono .............................. 701/211 |
| 2009/0125234 A1* | 5/2009 | Geelen et al. ................. 701/209 |
| 2010/0070173 A1* | 3/2010 | Sakamoto ..................... 701/209 |
| 2010/0161658 A1* | 6/2010 | Hamynen et al. ............. 707/770 |
| 2010/0191459 A1* | 7/2010 | Carter et al. .................. 701/208 |
| 2010/0268451 A1* | 10/2010 | Choi .............................. 701/201 |
| 2011/0106595 A1* | 5/2011 | Vande Velde ................ 705/14.4 |
| 2011/0221771 A1* | 9/2011 | Cramer et al. ................ 345/633 |
| 2012/0001938 A1* | 1/2012 | Sandberg ...................... 345/633 |

FOREIGN PATENT DOCUMENTS

| | | |
|---|---|---|
| WO | 2007080473 | 7/2007 |
| WO | 2007125377 | 11/2007 |
| WO | 2008099092 | 8/2008 |

* cited by examiner

| Class Name | Function | Button |
|---|---|---|
| ScreenMain | Enter selected screen | Left, OK |
| | Exit | Right |
| ScreenLogIn | Log in/out | Left |
| | Go back | Right |
| ScreenView | Change search options | Left |
| | Go back | Right |
| ScreenFind | Change search options for specific category | Left |
| | Go back | Right |
| ScreenFindItems | Select target | OK |
| | Sort list of targets by proximity | Menu →Sort by Proximity |
| | Sort list of targets alphabetically | Menu →Sort Alphabetically |
| | Cancel | Right |
| ScreenEditItems | Edit selected item | OK |
| | Create new item | Left |
| | Delete selected item | Menu → Delete |
| | Cancel | Right |
| | Only for New Place, Edit Place screens: Populate fields with current GPS data | Menu → Populate with Current GPS |
| DialogOK | Confirm | Left |
| DialogYesNo | Respond with Yes | Left |
| | Respond with No | Right |

FIG. 8

| Category | Parameter | Format | Description |
|---|---|---|---|
| Relative coordinates between user and target phone | DistNorth | 32-bit signed float | How far North (or South) the target is from the user [m] |
| | DistEast | 32-bit signed float | How far East (or West) the target is from the user [m] |
| | DistAbove | 32-bit signed float | How far above (or below) the user the target is located [m] |
| Tilt of user's phone | Heading | 32-bit signed float | The angle that the user's phone makes with respect to the negative z-axis [°] |
| | Pitch | 32-bit signed float | The angle that the user's phone makes with respect to the y-axis [°] |
| | Roll | 32-bit signed float | The angle that the user's phone makes with respect to the x-axis [°] |

FIG. 10

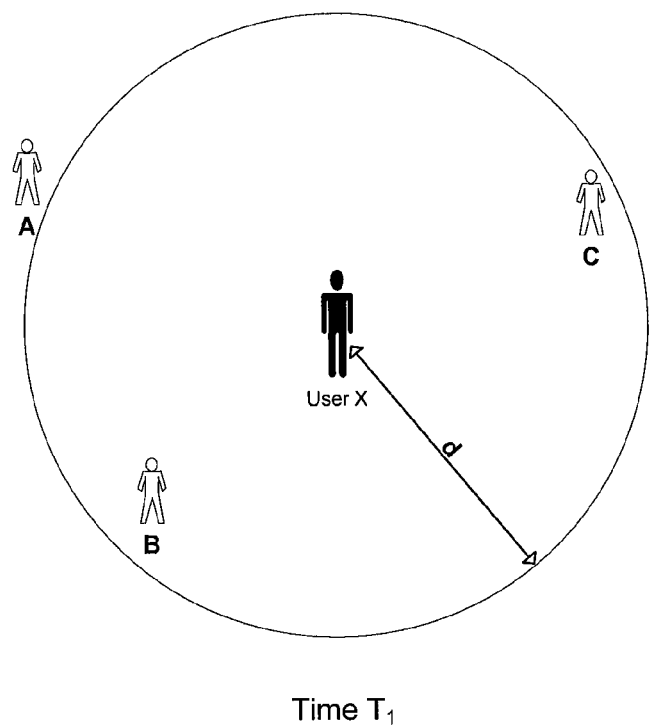
Time $T_1$
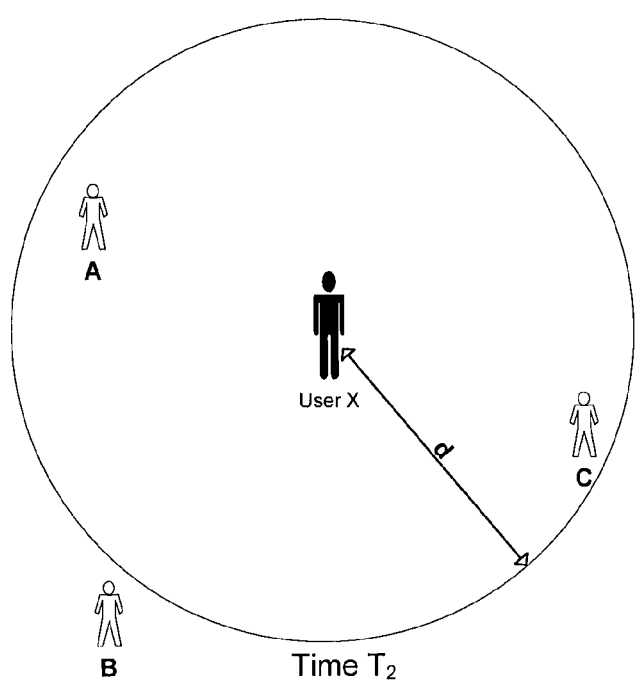
Time $T_2$
FIG. 11

SYSTEMS, APPARATUS AND METHODS FOR DELIVERY OF LOCATION-ORIENTED INFORMATION

RELATED APPLICATIONS

This application is a continuation of U.S. patent application Ser. No. 12/358,173, now U.S. Pat. No. 8,239,132, filed on Jan. 22, 2009 and entitled SYSTEMS, APPARATUS AND METHODS FOR DELIVERY OF LOCATION-ORIENTED INFORMATION, which claims the benefit of U.S. Provisional Application Ser. No. 61/022,677 filed on Jan. 22, 2008 and entitled MOBILE SYSTEM FOR DELIVERY OF LOCATION-ORIENTED INFORMATION, the entire contents of both applications are hereby incorporated by reference in their entirety for all purposes.

FIELD

The embodiments described herein generally relate to systems, apparatus and methods for locating and tracking of objects, and in particular to displaying location information relating to mobile targets.

Introduction

Geographical positioning systems are now regularly employed as navigational aids to assist travelers reach their destination. It is not unusual for a traveler to seek assistance from a geographical positioning system to receive guidance and directions to arrive at a particular destination.

Typically, prior to starting a trip, a user of a GPS device will input a destination into the GPS device, which typically stores a copy of a map of the user's current location and the destination location. The input of the destination may be done by providing a street address, or indicating a point of interest on a local map. In some instances, multiple destinations may be indicated. However, if a destination is not stationary, the user normally has to continuously manually update the system with the destination's current geographical position to ensure that the system is directing the user to the desired destination.

GPS systems are also capable of determining the geographical location of the user of the system. This permits the system to update the user's location on a 2D or 3D map such that the user may be regularly informed of his/her present location relative to the map. This also permits the system to plot a path that may be used to reach the destination(s) entered and display that path on the map.

However, the path is normally displayed on a map that represents the real world. Typically the maps of the routes do not correspond to a real live view that a user on one of the transportation routes might experience. Accordingly, if a user is unskilled or unfamiliar with reading or interpreting maps, the user may experience difficulties in using the map with the path overlay.

Accordingly there is a need in the art for improved systems, apparatus and methods for delivery of location based information.

SUMMARY

According to one aspect of the invention, there is provided an augmented reality guiding system for delivery of location-oriented information, comprising a location server, a database coupled to the location server and configured to receive, store, customize and send target information relating to target points of interest, and at least one mobile locating device, each mobile locating device having a geographical positioning module configured to determine location information for that locating device, an imaging module configured to capture at least one image of at least some of a field of vision for that locating device, a spatial orientation detection module configured to determine spatial information of that locating device, a display module configured to provide visual feedback, and at least one wireless communication module configured to communicate with the location server; wherein each mobile locating device is configured to be able to receive target information relating to at least one target points of interest from the location server, and based on the target information and the location information and spatial information for that locating device, display the target information relating to the target point of interest by visually augmenting the at least one captured image on the display module.

The target information may include at least one of location information indicative of a location of each target point of interest, spatial orientation information indicative of spatial information relating to each target point of interest, permission information for determining whether the target information is accessible or relevant, and grouping information about how each target point of interest is organized.

At least one of the target points of interest may be a mobile locating device.

Each locating device may be further configured so that, when a target point of interest is not within the field of vision the visually augmenting of the at least one captured image includes indicating a direction from the locating device to a location of the target point of interest.

At least one of the target points of interest may be non-mobile.

Each locating device may configured to store target information relating to at least one non-mobile target in the data storage module locally on the locating device.

Each locating device may be configured to allow target points of interest to be added and stored in at least one of the data storage module and the location server.

In some embodiments, the imaging module, geographical positioning module, spatial orientation detection module, input module, display module, and communication module are integrally coupled. In other embodiments, the geographical positioning module and spatial orientation detection module are removably coupled to the locating device.

In some embodiments, the geographical positioning module and spatial orientation module are configured to communicate with the input module, display module, and communication module using a wireless interface.

According to another aspect of the invention, there is provided a mobile locating device for an augmented-reality guiding system, comprising a geographical positioning module configured to determine a location information for the locating device, an imaging module configured to capture at least one image of at least some of a field of vision for the locating device, a spatial orientation detection module configured to determine spatial information for the imaging module of the locating device, a display module configured to provide visual feedback, and at least one wireless communication module configured to communicate with a location server, wherein the location server is in communication with a database configured to receive, store and send target information relating to target points of interest, the mobile locating device is configured to be able to receive target information relating to at least one target points of interest from the location server; and based on the target information and the location information and spatial information for the locating device, display the target information relating to the target point of interest by visually augmenting the at least one captured image on the display module.

DRAWINGS

For a better understanding of the present invention and to show more clearly how it may be carried into effect, reference will now be made, by way example, to the accompanying drawings, in which:

FIG. 8 is a table showing a mapping of various functions to user input buttons in one embodiment;

FIG. 10 is a table listing some information that a locating device might process according to one embodiment;

FIG. 11 is a block diagram displaying a tracking function according to one embodiment;

DESCRIPTION OF VARIOUS EMBODIMENTS

Figure 1:
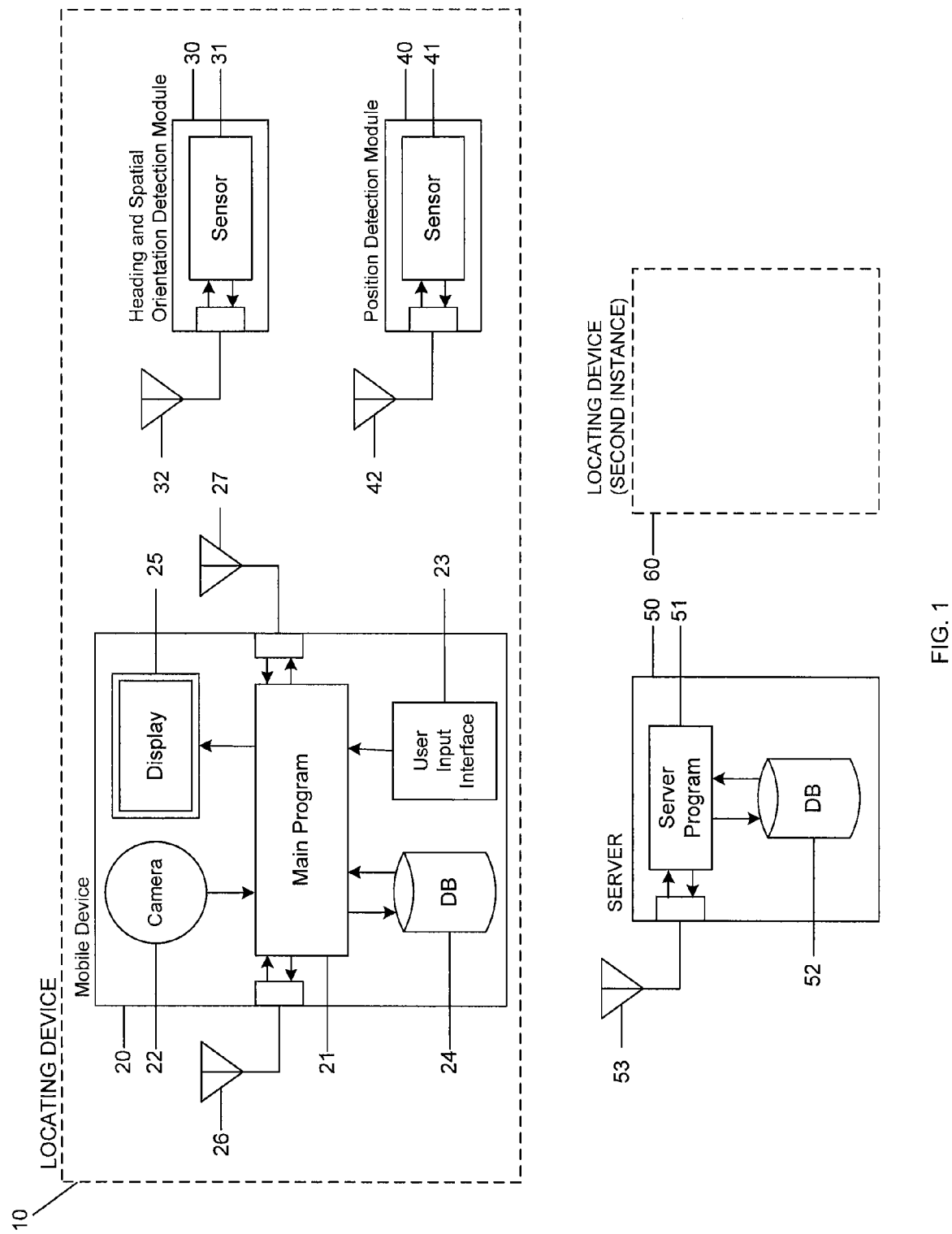
FIG. 1 is a block diagram of a locating device and a location server according to one embodiment of the invention.
Figure 2:
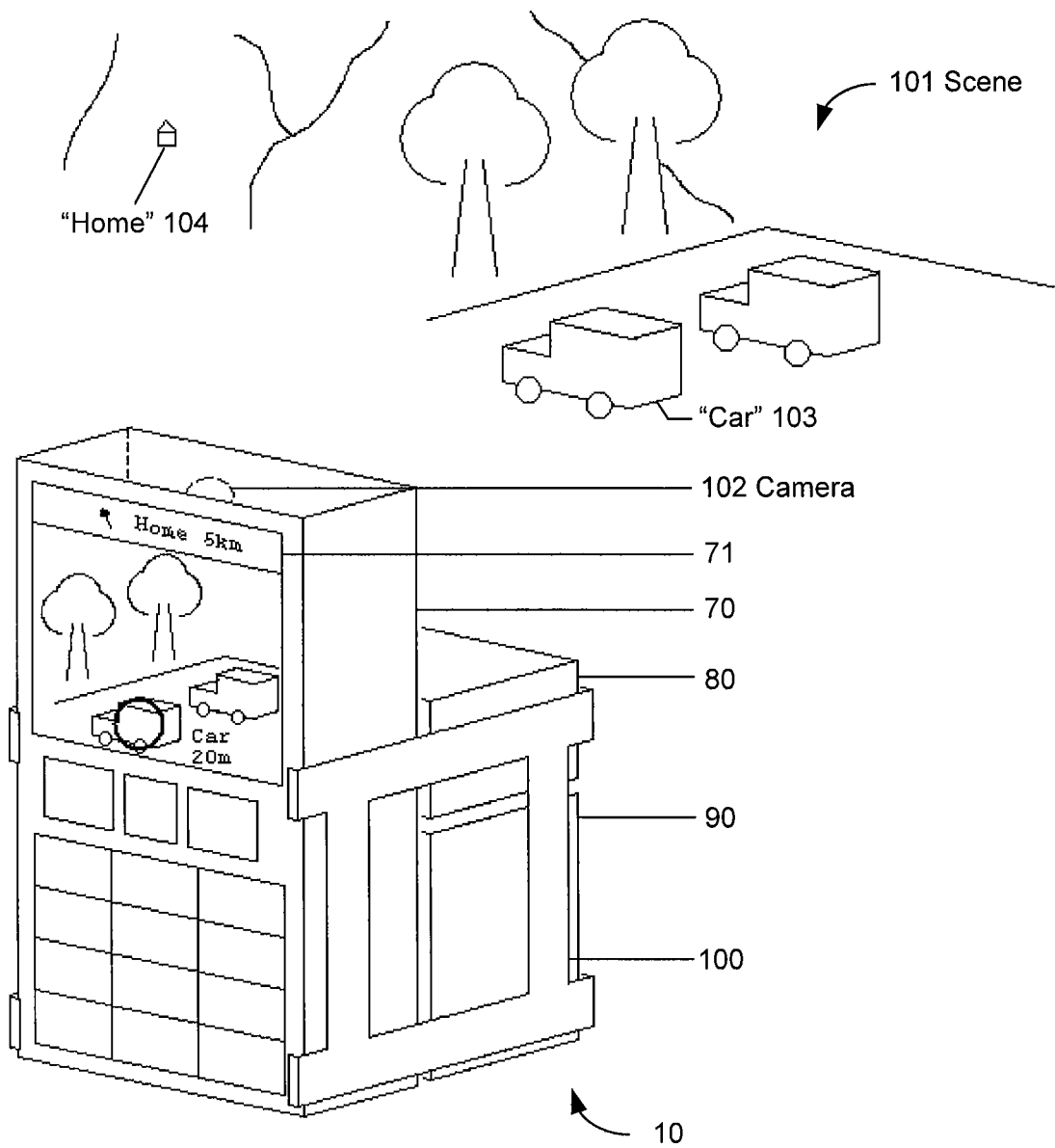
FIG. 2 is a perspective view of a locating device according to one embodiment at an exemplary scene.
Figure 3:
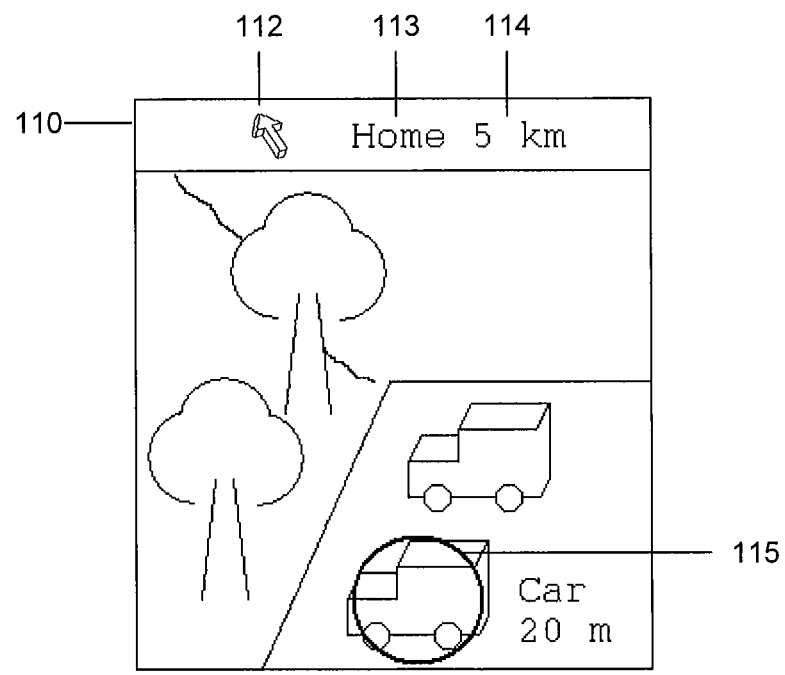
FIG. 3 is a diagram of a display module of the locating device of FIG. 2 displaying a visual representation of the exemplary scene.

Turning now to FIGS. 1 to 3, illustrated therein is a mobile system for the delivery of location-oriented information having at least one locating device in accordance with one embodiment of the invention.

Referring more specifically to FIG. 1, the system as shown includes a first locating device 10, a wirelessly accessible server 50, and a second locating device 60 similar to the first locating device 10. In some other examples, the system may include more than two locating devices.

According to this embodiment, the locating device 10 includes a mobile telecommunications device 20, a heading and spatial orientation detection module 30, and a geographical position detection module 40. The mobile telecommunications device 20 includes a main program 21, an imaging module such as a camera 22, a user input interface 23 such as a keypad, a data storage module such as a database 24, a display module 25, a first wireless communication module 26 such as a wireless Internet interface, and a second wireless communication module 27 such as a Bluetooth interface.

In another embodiment, the imaging module may be a transparent portion of the locating device which may be shaped similar to a thin card.

The heading and spatial orientation detection module 30 may include a heading and spatial orientation sensor 31, such as a tilt-compensated digital compass, and a wireless interface 32 such as a Bluetooth interface.

The position detection module may include a position sensor 41, such as a global positioning system (GPS) receiver, and a wireless interface 42 such as a Bluetooth interface.

During use, the wirelessly accessible server 50 handles sharing of the location data of the locating device 10 and locating device 60. The server 50 generally has a server program 51, a database 52 and a wireless interface 53, such as a wireless Internet interface.

The server 50 is generally configured to receive, store and send target information relating to various target points of interest. A target point of interest may be one or more mobile locating devices, or a non-mobile target. For example, in FIG. 2, target points of interest include "Car" and "Home".

The server 50 may also store the target information in a database 52. In some embodiments, the target information may include location information about the target points of interest (e.g. each locating device or other mobile or non-mobile targets).

The location information generally includes information indicative of the geographical location of each target point of interest. In one example, the location information could be longitude and latitude information. In other examples, the location information might be information relating to GPS indoor extension systems such as pseudolites, GPS reradiating systems, or other proximity detection systems such as ultrasound, infrared, RFID, WLAN, Bluetooth.

In addition to the location information, the target information may also include spatial orientation information. The spatial orientation information is generally indicative of the positioning of an imaging device (such as the camera 22) so that visual images captured by the imaging device may be associated with a particular orientation. The visual images captured by the imaging device generally represent at least part of a user's field of vision when the image is captured.

The target information may also include organization information including permission information related to target point of interest (e.g. whether the target point of interest wants to share its location, or share different versions of information depending on the querying user's properties, such as whether the user has a deluxe account or a basic account). The organization information may also include grouping information relating to a number of locating devices such as a "best friends" group, as will be described in greater detail below.

The target information may also include information regarding the target point of interest such as an associated user's name. In other embodiments, target information may include additional description or information associated with a particular target. For example, if the target is a store, target information might include hours of operation. In another example, if the target is a booth or a display at a convention, the target information might include a vendor associated with that booth. In another example, target information may contain advertising or promotional information.

Target information may not necessary be in just text form. Target information may contain multimedia content such as audio, video or photos. For example, if a target is a display at a museum, the target information may include audio commentary explaining the display. In another example, if the target is a movie theatre, target information may include video trailers of current movies that may be screening.

Now referring to FIG. 2, the locating device 10 is shown in one mode of operating in an example where the user tracks two objects or target points of interest labeled "Car" 103 and "Home" 104. The locating device 10 includes the heading and spatial orientation detection module 80 and the position detection module 90, both affixed to the mobile telecommunications device 70 by a harness 100.

The locating device 10 captures a video feed of an actual scene 101 with a camera 102 (including one or more images of the actual scene 101) and displays the video feed on a view screen 71 of the display module 25 with location data overlaid thereon.

Note that in this example, the target point of interest "Home" is much further away from the locating device (5 km) than the target point of interest "Car" (20 m). Accordingly, in some embodiments, the target point of interest "Home" 104 may not be fully captured due to the limited field of view of the camera 102, while the target point of interest "Car" 103 (which is generally much closer) may be fully or nearly-fully captured by the camera 102.

The content of the view screen 71 may be shown more clearly in FIG. 3. In some embodiments, the coordinates of the locations of "Home" 104 and "Car" 103 may be entered into the locating device 10 and stored in the database 24. This may be done, for example, by directly specifying coordinates of each target point of interest or by detecting and saving the coordinates for each target point of interest when the locating device was at the location of "Home" or at "Car".

Since the target point of interest "Home" may not be fully captured, it may not be visible on view screen 110. Accordingly, its direction may be indicated by a 3D arrow 112 pointing to the actual direction of "Home" with respect to the view of camera 102 (as shown in FIG. 3). In some embodiments, the distance 114 from the locating device 1 to the target point of interest "Home", and its corresponding label 113, may also be displayed. The distance 114 and position of the 3D arrow 112 may be computed by the main program 21 using heading and spatial orientation data with respect to the view of the camera 102 using the heading and spatial orientation module 30, positional data of the locating device 10 from position detection module 40 and the positional data of the targeted objects stored in database 24.

However, since the target point of interest "Car" is generally within the view of the camera 102 and can be fully captured, it may be presented with an indicator/mark 115 such as a circle drawn generally over where the actual object (e.g. the Car) appears on the video feed on the view screen 71.

Referring back to FIG. 1, in some embodiments the locating device 10 may be used to track a mobile target object such as the second locating device 60. For example, the position detection module 40 may periodically determines the position of the locating device 10 using the position sensor 41. The main program 21 may periodically receive the position data associated with the locating device 10 from the position detection module 40 (e.g. through the communication link provided by one or more of the wireless interfaces 27 and 42). The main program 21 may then store the position information in the database 24, and may also submit the information to the server 50 via the wireless interface 26. The server program 51 may receive the position information through the wireless interface 53 and may subsequently store user position information of locating device 10 in the database 52.

Similarly, the position of locating device 60 may also be determined, stored, and submitted to the server 50.

The heading and spatial orientation detection module 30 may periodically determine the heading and spatial orientation of the locating device 10 using the sensor 31, and the main program 21 may periodically receive the heading and spatial orientation of the locating device 10 through the communication link over the wireless interfaces 27 and 32. The main program 21 may then store the heading and spatial orientation information in the database 24.

To track the locating device 60, the main program 21 of the locating device 10 may request the positional information of the locating device 60 from the server program 51 (e.g. via the wireless interface 26). The server 50 may receive the request through the wireless interface 53.

If the locating device 10 has the required permissions to access the positional information of the locating device 60 (e.g. if the locating device 60 has authorized the locating device 10 to access its positional information, or if the locating device 60 permits its positional information to be publicly accessible to all locating devices), the server program 51 may respond to the locating device 10 by sending the positional information of the locating device 60 to the main program 21 of the locating device 10 through the wireless interfaces 53.

However, if the locating device 10 does not have the required permissions to access the positional information of the locating device 60, the server program 51 may not send the positional information of the locating device 60 and instead may notify the locating device 10 that it lacks the positional information of the locating device 60 and/or that the locating device 10 lacks suitable permissions to access the positional information of the locating device 60.

Where the locating device 10 has the required permissions, upon receiving the positional information of the locating device 60, the main program 21 of the locating device 10 may store the received positional information in the database 24. The main program 21 may then retrieve a video feed from camera 22. Using the positional information of both locating devices 10 and 60 stored in the database 24, the main program 21 may calculate the distance between the locating devices 10, 60.

Furthermore, using positional information of the locating device 10, heading and spatial information of the locating device 10, and positional information of the locating device 60 stored in the database 24, the main program 21 may calculate the direction to the locating device 60 with respect to the field of view of the camera of the locating device 10. With the calculated distance between the locating devices 10 and 60 and the direction to locating device 60 with respect to the camera of locating device 10, the main program 21 may determine whether the locating device 60 is within the field of view of the camera of the locating device 10.

The display of the positional and directional information about the locating device 60 may be similarly displayed as the information about the target points of interest (e.g. "Home" and "Car") as previously described with respect to FIG. 3. If the locating device 60 is within the field of view of the camera of the locating device 10, the main program 21 may mark or identify the locating device 60 on the video feed displayed on the view screen 71.

In some embodiments, the size of the indicator/mark may be related to the actual distance between the locating devices 10, 60. For example, the indicator/mark may be small if the locating device 6 is far away from the locating device 10, and may be large if the locating device 60 is closer, and vice versa. In some embodiments, the size of the indicator/mark may change as the distance between the locating devices 10, 60 changes.

In some embodiments, where the locating device 60 is not within the field of view of the locating device 10, the main program 21 may display an indicator (e.g. a two or three dimensional arrow) oriented in the direction of the locating device 60 on the view screen 71.

According to some embodiments, the locating device 10 may track multiple other locating devices based on organizing information. Organizing information may include various criteria to determine if target information relating to a target point of interest should be provided to the mobile locating device 10. This may be helpful to locate a number of mobile points of interests that meets a certain criteria. For example, organizing information may relate to the proximity in distance between the locating device 10 and the target mobile points of interest, and the target information may only be displayed (in some embodiments) wherein the proximity is less than a certain threshold (e.g. less than 10 km, 1 km or 100 m).

Referring to FIG. 11, in some embodiments a user X using the locating device 10 may wish to locate other users A, B and C within a threshold distance d of the user X. At a first time $T_1$ the user X may receive target information relating to user B and user C indicating that these users B, C satisfy the tracking criteria of the locating device 10 (e.g. within the threshold distance d). However, at time $T_2$, since both user X and user B may be mobile, the distance between user X and user B is now greater than the threshold distance d. Accordingly, user X may no longer receive information about user B on the locating device 10. However since user A is now in range (e.g. within the threshold distance d), the user X may receive target information about the user A.

While FIG. 11 illustrates one embodiment relating to criteria for finding other mobile points of interest, (namely specifying a threshold distance as one criterion), other criteria may be employed. For example, another criterion may be grouping information relating to a number of locating devices such as a "best friends" group. For example, a user may only wish to identify himself or herself as available only to a selected group of other locating devices.

Another exemplary criterion may relate to tracking of a particular locating device so that the particular locating device may be readily located and monitored.

Yet another criterion may be a security setting or availability indication of the target point of interest. For example, at times a user of a locating device may not wish to be disturbed (e.g. when they are studying or want to be alone) and therefore the user may set the locating device to an "invisible" mode such that other locating devices will not obtain location information about that user.

Referring again to the embodiment shown in FIGS. 1 to 3, target objects of interest may be organized in multiple ways, not all of which are mutually exclusive. For example, one way of organizing objects of interest may be to categorize objects by groups. A basic organization method may be to categorize objects of interest into generic or predefined groups such as "people" and "places". Objects of interests may also be further organized into user-defined groups, such as a "restaurants" group or a "best friends" group. A generic group may possibly contain people, places and/or other entities.

Another way to organize objects of interests may be to categorize them statically or dynamically. In some embodiments, the organization of objects may be changed by the user or may be automatically changed by the main program 21. For example, the user may be allowed to modify a list of objects of interest in a group using the user input interface 23. Alternatively, the main program 21 may request information about the closest ten friends within a 1 km radius from the server 50 and may update the database 24 with this information, hence dynamically updating and grouping objects of interests by criteria such as proximity.

Yet another way to organize objects may involve categorizing objects of interest by their current availability. In particular, not all objects of interest may have updated position information in the database 52. For example, the locating device 6 may have been logged off or shut down for an extended period of time, and therefore no current positional information may be available in database 52. As such, the user of the locating device 10 may be able to distinguish between target objects of interest that are currently available and those that are not available.

Other suitable methods or techniques for organizing objects may be used alone or in combination with the above-noted techniques.

In some embodiments, the target objects of interest may be defined by many characteristics, such as a name, a description, a position, one or more group memberships and properties relating to the type of indicator or mark and/or arrow used to display locational information on the view screen (e.g. different colors, shapes, etc.). Some or all of these characteristics may be stored in the locating device's database. Some or all of these characteristics may be stored in the server database 52.

In some embodiments, users may or may not require permission in order to add an object as a target object of interest. For example, adding a restaurant as an object of interest may not require permission, while adding the locating device of a friend as an object of interest may require permission. In some embodiments, such permissions may be granted by server 50, by the object of interest itself, and/or by a user.

Turning now specifically to the server shown in FIG. 1, in some embodiments the server program 51 may facilitate the sharing of coordinates between locating devices and may control the sharing of coordinates. However, the coordinates stored in the server database 52 may not be limited to coordinates of locating devices. Coordinates of static target objects of interest (e.g. restaurants and other fixed locations) may be stored in the server database for use by various locating devices. In some embodiments, locating devices may log into (and optionally out of) the system through the server as well (e.g. using a login name and password, for example).

In some examples, the mobile telecommunications device 20 may be a cell phone with a camera 22, a Bluetooth interface 27, Internet access 26, and may run a Java platform for mobile telecommunications devices supporting video overlay. The sharing of user location data may be facilitated by the server 50 being an HTTP server running server-side scripting (e.g. server program 51) written in a suitable programming language (e.g. Perl).

Figure 13:
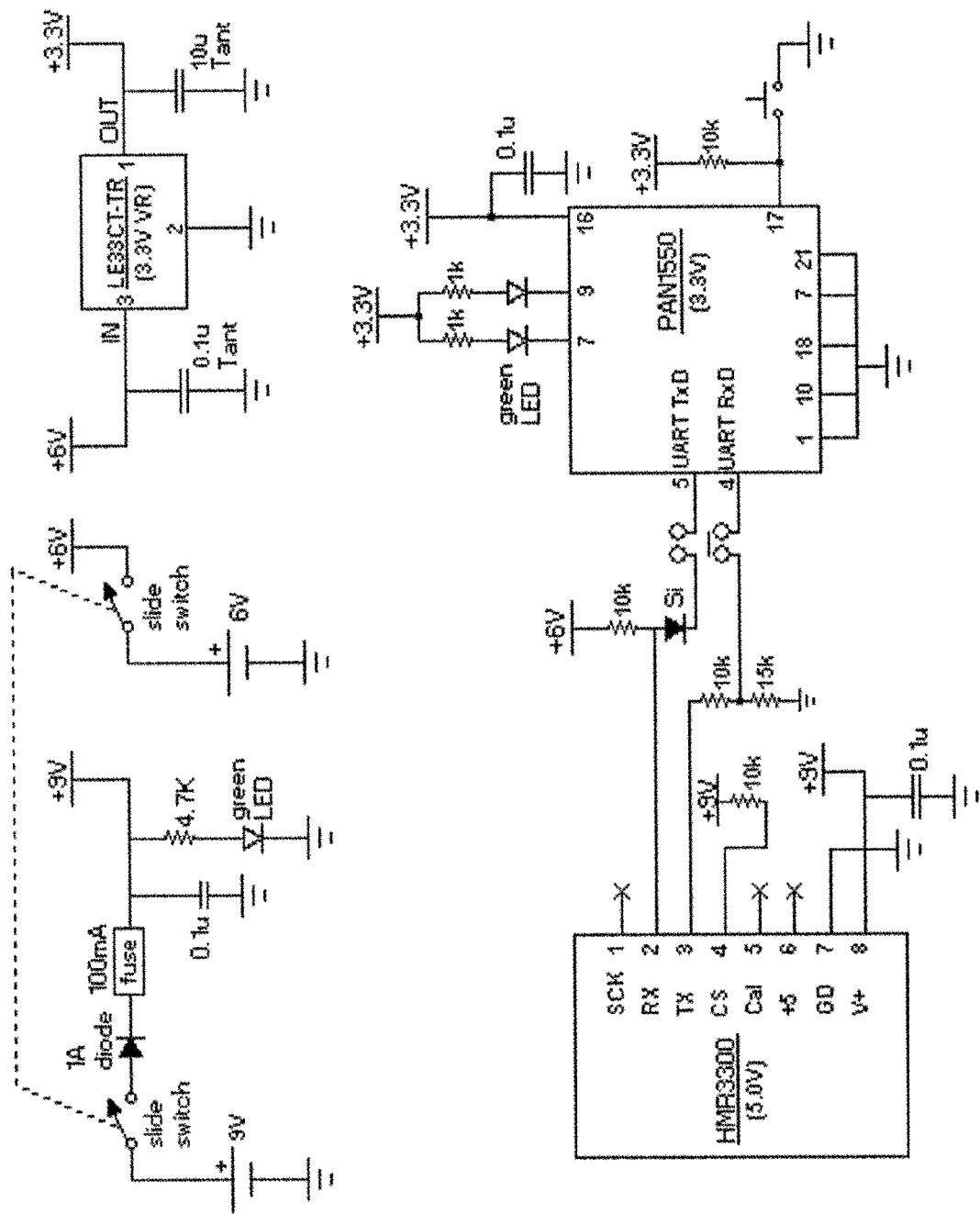
FIG. 13 is an exemplary circuit diagram according to one embodiment.

The positioning module 40 may be a GPS receiver 41 with Bluetooth interface 42. The heading and spatial orientation module 30 may be a tilt-compensated digital compass 31 that outputs heading, roll, and pitch data via a universal asynchronous receiver/transmitter (UART) interface to a Bluetooth module 32. One example of a circuit diagram of a circuit that connects the tilt-compensated-compass chip to the Bluetooth chip and powers both these chips is shown in FIG. 13.

In some embodiments, the main program may use Java Specification Request (JSR) 135 to control the cell phone's camera, JSR 82 to access the Bluetooth interface, JSR 139 to access the Internet (e.g. to communicate with the server 5), JSR 184 to create 3D graphics, JSR 135 or JSR 234 to overlay graphics on the video feed, and JSR 118 to present the graphical user interface.

The embodiment depicted generally in FIGS. 1 to 3 may have many alternative configurations. For example, in some embodiments, the label 113 may be defined by user or given a generic name by the locating device.

In some embodiments, one or more objects may be tracked simultaneously, and their locational data may be shown on the view screen as a plurality of arrows 112, labels 113, distances 114 and marks 115.

In some embodiments, the shapes, colors, and/or textures of the marks 115 and the arrows 112 may be different and may be defined by either the user or the locating device 10.

In some embodiments, the arrows 112 may be 2-dimensional or 3-dimensional.

In some embodiments, locational information such as arrows 112, labels 113, distances 114 and/or marks 115 may be auditory, and may include the use of automated voice systems and/or varying the pitch and frequency of various beeping sounds or other alerts.

In some embodiments, the locational information may include tactile feedback, such as providing varying strengths and patterns of vibration to the locating device 10.

In some embodiments, locational information may one or more combinations of visual, auditory, tactile and any other suitable notification techniques.

In some embodiments, communication links 26, 23, 32, 42 and 53 between various components may include any generally reliable communication links (e.g. any wired communication links such as serial/parallel interfaces, and wireless communication links such as the WiFi and Bluetooth links).

In some embodiments, the communication links 26 and 27 may be combined or duplicated to provide increased redundancy.

In some embodiments, the locating device 10 may be configured to include more than one communication link to accommodate various communication standards (e.g. CDMA, TDMA, GSM, etc.).

In various embodiments, all of the components generally shown in FIG. 1 may be integrated together or separated apart into various modules or groupings. For example, the camera 22 may not be a part of the mobile telecommunications device 20 (but instead may be provided as a separate module), the display 25 may be separated from the camera 22 and/or the mobile telecommunications device 20, and the heading and spatial orientation detection module 30 may be integrated with the position detection module 40 as one component or module.

In some embodiments, the system as illustrated in FIG. 1 may have more than one server 50 to provide for load balancing and redundancy.

In some embodiments, the system as illustrated in FIG. 1 may be configured to be used in outdoor environments, indoor environments (as generally described with reference to FIG. 4) or both.

In some embodiments, various types of one or more suitable position detection modules 40 (e.g. ultrasonic position detection modules and GPS receivers) may be included in the locating device 10 for all/mostly outdoor usage, all/mostly indoor usage or both indoor and outdoor usage.

In some embodiments, the main program 21 may not provide distance information 114 to the target object of interest, but may only provide direction information.

In some embodiments, the main program 21 may not determine straight-line directional information to the target object; instead, it may use static preloaded information (e.g. static maps) or dynamic information (e.g. live information about traffic video feeds from sources such as the Internet, and other accessible information) to determine and provide to the user a restricted path, such as a path restricted to roads, pedestrian walkways, sidewalks, paved paths, or any other paths generally free of obstacles and subject to user preferences.

In some embodiments, other devices capable of capturing and providing a video feed on the view screen 71 may be used, including one or more images from satellite, or a juxtaposed video feed from individual video feeds from one or more stationary cameras.

In some embodiments, each target object of interest may either be a stationary object or may be a mobile object.

In some embodiments, the system may have internal live video feeds upon which additional information can be overlaid. Labels may be overlaid on top of the corresponding target objects in the video feed on the display. Directional information relating the location of the user relative to the target object may be overlaid onto the video feed on the display.

In some embodiments, the system may be configured to determine the distance between the target object and the user within a maximum error of 20 meters. In other examples, the maximum error may be 10 meters. In yet other examples, the maximum error may be 45 meters. In yet other examples, the maximum error may be 90 meters.

In some embodiments, the system may have video capture and playback capabilities.

In some embodiments, the system may provide a search function for searching for target objects of interest. The search function may be provided through a graphical user interface displayed on the view screen 71.

Figure 5:
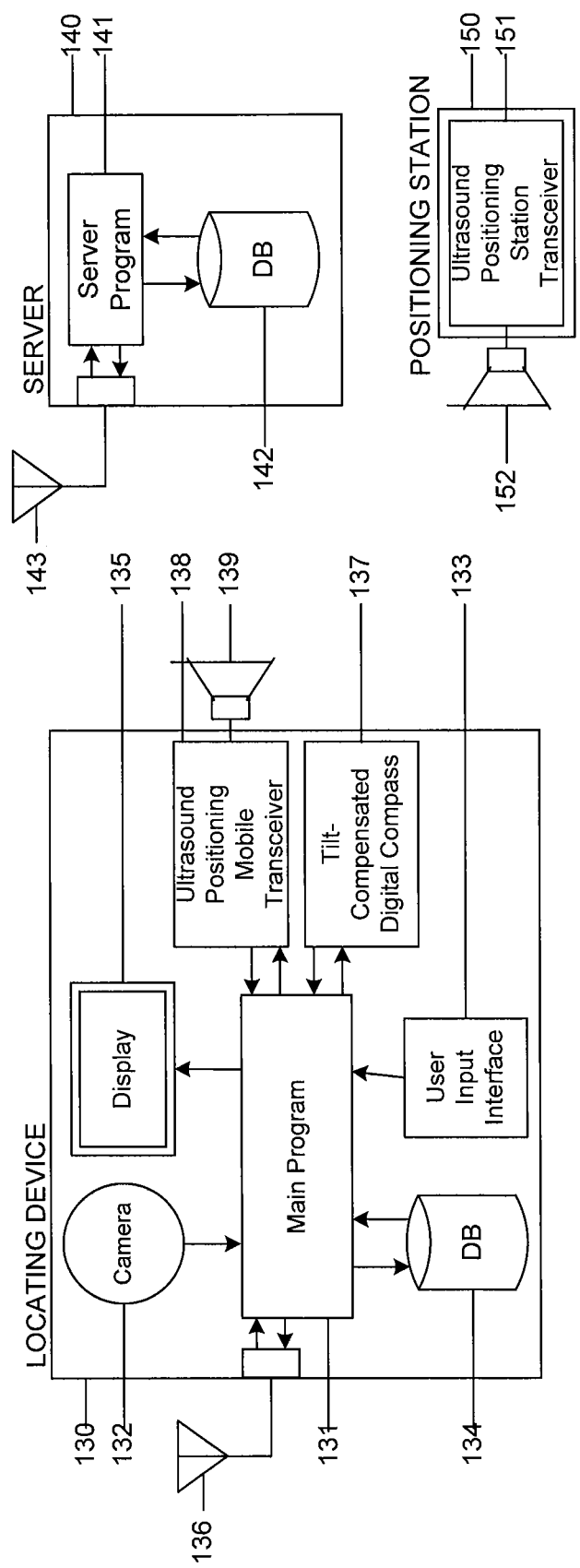
FIG. 5 is a block diagram of a locating device, server and a positioning station according to another embodiment.
Figure 6:
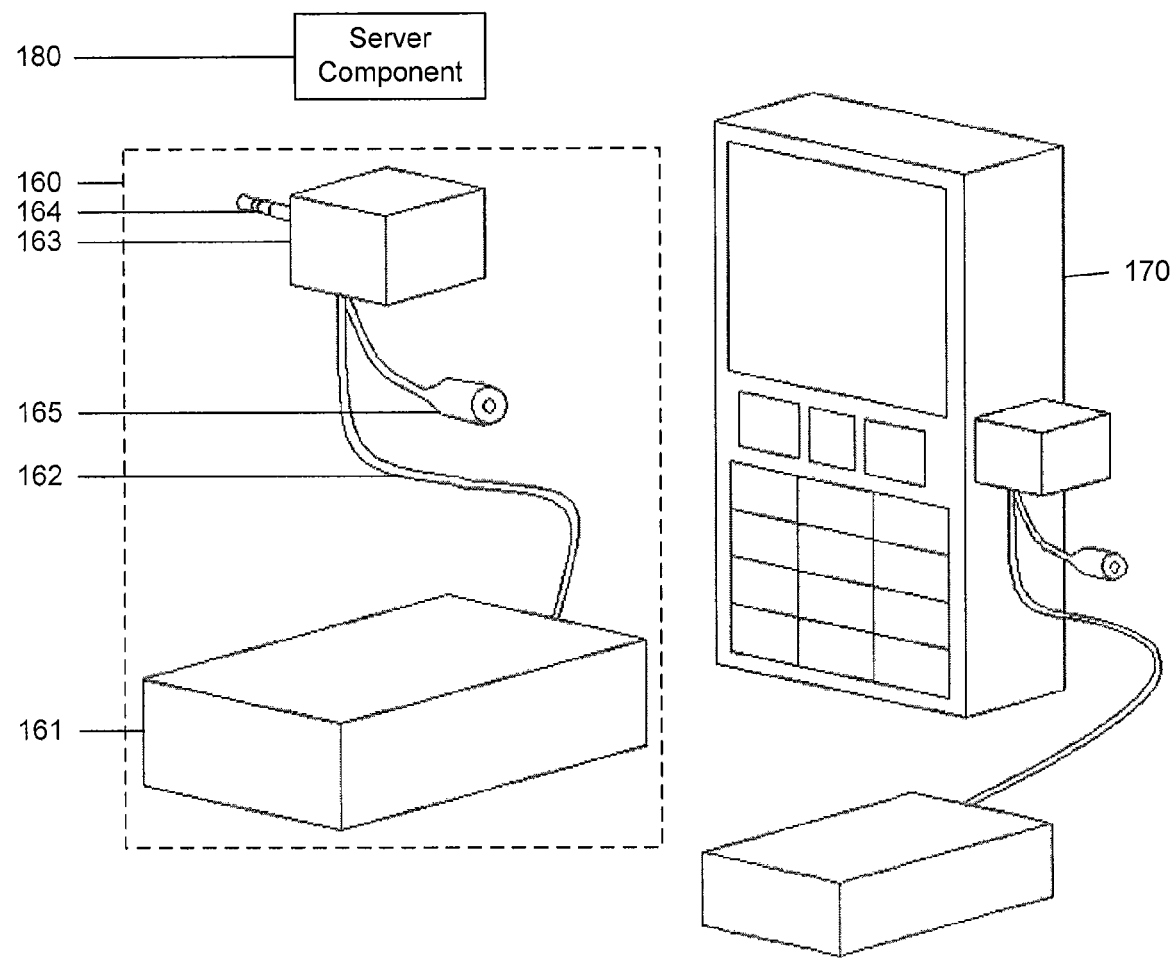
FIG. 6 is a perspective view of a locating device according to another embodiment.

Referring now to FIGS. 5 and 6 generally, a mobile system for the delivery of location-oriented information is shown in accordance to a second embodiment of the invention. This embodiment is generally configured for use in an indoor environment, such as for a museum tour guide application or within a trade show.

As shown, the system includes a locating device 130 having a main program 131, a camera 132, a user input interface 133 such as a keypad, a database 134, a display module 135 (which may include peripherals such as a view screen), a heading and spatial orientation detection sensor 137 (e.g. a tilt-compensated digital compass), a position detection sensor 138 (e.g. an ultrasonic positioning mobile transceiver), a first communication link 139 (e.g. an ultrasonic mobile transducer), and a second communication link 136 (e.g. a wireless Local Area Network (LAN) interface).

The locating device 130 may also be given a unique identification number such as a serial number.

The system further includes a server 140 which may be wirelessly accessible for handling and sharing mobile locational data, and at least one positioning station 150 for enabling positional detection. The server 140 generally has a server program 141, a database 142 and a communication link 143 (e.g. a wireless LAN interface). Each positioning station 150 generally includes a transceiver 151 (e.g. an ultrasonic transceiver) and a communication link 152 (e.g. an ultrasonic transducer).

Figure 4:
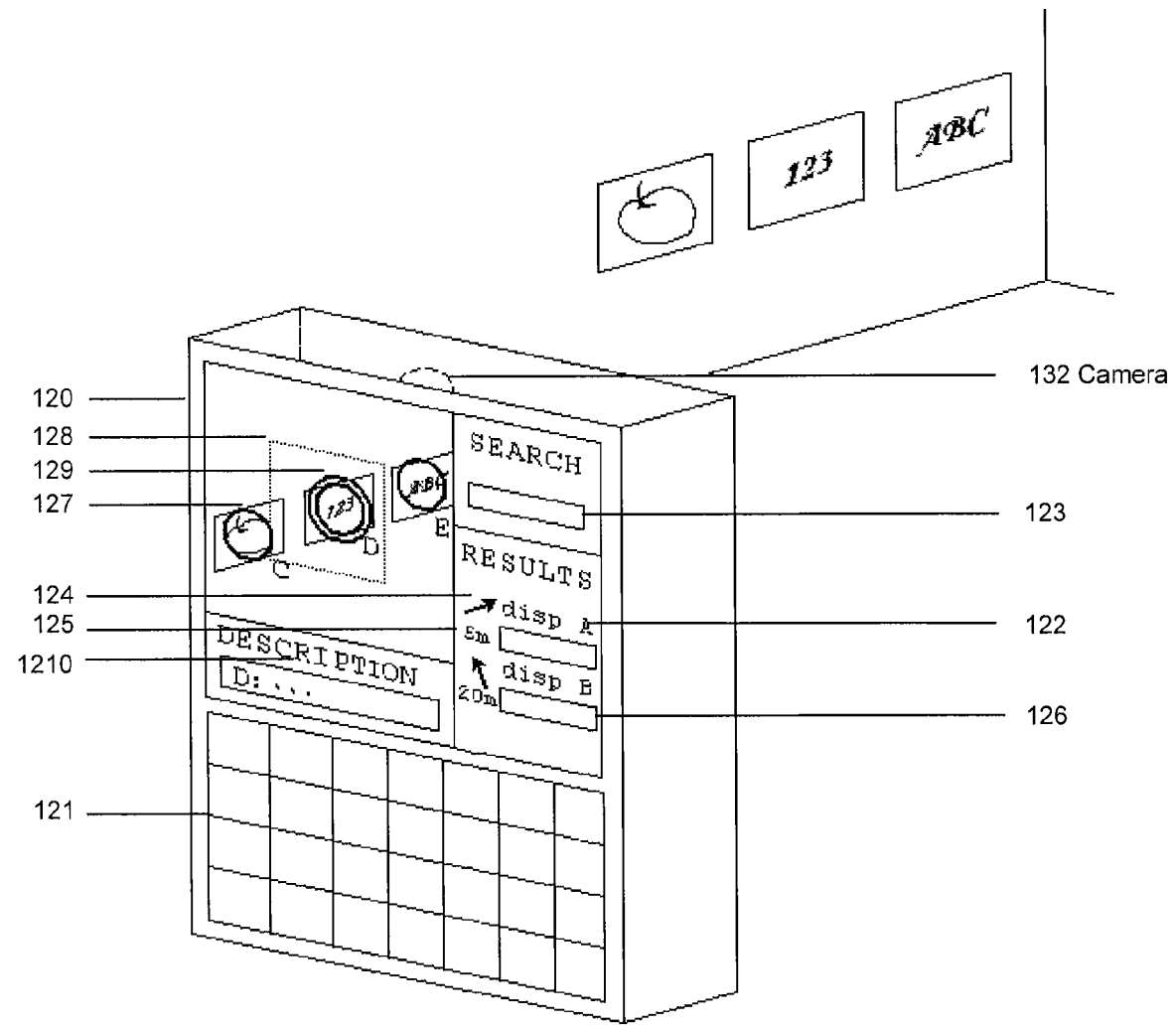
FIG. 4 is a perspective view of a locating device according to another embodiment at another exemplary scene.

As illustrated in FIG. 4, this system may be useful for indoor or mostly indoor applications, such as a tour guide application in a museum. Users may each have one mobile locating device 120, shown with keypad 121, view screen 122 and camera 132.

The database 142 of the server 140 may include information for exhibits within the museum, as well as the locations of locating devices. The main program 141 may include enhancements to facilitate the tour guide application, such as a keyword search 123 that may be used present a list of relevant exhibits (based on search keywords, etc.). Each exhibit may have an associated description 126, distance information 125, and directional information 124, such as a 3D directional arrow.

Exhibits within the camera's field of view may have indicators/marks 127 shown on the view screen 122 for highlighting the exhibits on the view screen. When a particular exhibit falls within a central zone 128 of the camera's entire field of view, the locating device 130 may display a highlighted indicator/mark 129 and specific descriptions 1210 associated with that exhibit.

In some embodiments, users desiring to track mobile objects (e.g. their companions or a tour guide) may use the corresponding locating device's serial number to dynamically locate the mobile object.

When using ultrasonic positioning transceivers and transducers, the ultrasonic positioning mobile transceiver 138 may send ultrasound bursts at various times (e.g. each time a position update is desired, for example at a frequency of 1 Hz), and may listen for echoes from each ultrasonic positioning station transceiver 151 located at various locations within the premises.

In some embodiments, the sound bursts may be encoded with the locating device's serial number. Each ultrasonic positioning station transceiver 151 may listen for the ultrasonic bursts, and may check if the burst originated from a specific ultrasonic positioning mobile transceiver 138 with the use of the encoded serial number.

If the burst came from an ultrasonic positioning mobile transceiver 138, the ultrasonic positioning station transceiver 151 may retransmit the burst, along with additional information such as its own station ID added to the burst. This may prevent the echoed bursts from being re-echoed by another station, since the other ultrasonic positioning stations may be programmed to ignore bursts containing a particular station ID.

At least one ultrasonic positioning station transceiver 151 may be distributed in each room so that, regardless of where the ultrasonic positioning mobile transceiver 138 is located, at least four ultrasonic positioning stations transceivers 151 are within listening range. Practically, the actual density of station transceivers 151 may be greater, since obstacles (e.g. the user's head/body or other persons in the room) may block one side of the ultrasonic positioning mobile transceiver 138.

After sending an initial burst, each mobile transceiver 138 may keep a time stamp of the time the burst was sent, and then listen for ultrasonic bursts and only capture those that contain its own serial number and a station ID. Echoes from at least four station transceivers 151 may give enough positional information for the locating device 130 to compute its position with respect to these ultrasonic positioning stations using a position determining techniques (e.g. trilateration, triangulation and multilateration).

The locating device 130 may submit this information to the server 140, which may compute a coordinate, record this coordinate in its database 142, and then send this information back to the locating device 130.

The embodiment depicted in FIGS. 5 to 6 may have many alternative configurations, for example any one or more of the alternative configurations generally described above.

Referring now to FIG. 6, a mobile system for the delivery of location-oriented information is shown in accordance to a third embodiment. The system may include a detachable separate module for use with smart phone/PDA type mobile telecommunications devices.

As shown, the system includes of an accessory 160, a mobile telecommunications device 170 and a server 180 similar to servers depicted in FIG. 1 or 6, such as a wirelessly-accessible server to handle optional sharing of mobile locational data.

The accessory 160 generally includes an electronic component 161 having a position, heading, and spatial orientation module such as a part/all of a GPS receiver in combination with a part/all of a tilt-compensated digital compass and a communication link such as a Bluetooth wireless interface for communicating with mobile telecommunications device 170. The system also includes a second electronic component 163 including a part/all of a GPS receiver in combination with a part/all of a tilt-compensated digital compass and a communication link (e.g. a cable) for communicating to the first electronic component 161.

This system may be useful for users that already have a mobile telecommunications device. In this case the user only needs to purchase the extra hardware components 160 and the corresponding software may be downloaded to the mobile telecommunications device provide the desired set of user features.

The user's mobile telecommunications device 170 may have all the capabilities described for mobile telecommunications device 20 in FIG. 1. Additionally, the mobile telecommunications device 170 may also have a communication link, such as an earphone jack or serial port (USB) for coupling with the accessory 160. In other examples, the earphone jack may be used as a hardware mechanism to attach the accessory 16 to the mobile telecommunications device 170, and may not be a communication link.

The GPS receiver and tilt-compensated digital compass may be combined into one electronic component 161 and may output data to the mobile telecommunications device 170 through a communication link, such as a wireless Internet interface, and which may also be combined into the electronic component 161.

Accordingly, the electronic component 161 may include a GPS receiver, processing components for a digital compass, a Bluetooth chip for Bluetooth wireless communication, and/or a battery source. The electronic component 161 may be connected to a second electronic component 163 by a connector 162 such as a cable.

The electronic component 163 may be smaller than the electronic component 161 and may house the sensor chips of the digital compass. The smaller module may be further built into the base of a plug 164 that may be compatible with the mobile telecommunications device 170, which may also provide a jack extension 165 for other conventional uses.

The embodiment depicted in FIG. 6 may have many alternative configurations, for example one or more of the alternative configurations described above.

Referring now to FIGS. 8 to 10, illustrated therein is an example of the design of the system's graphical user interface (GUI) and user input interface shown on a Motorola i880 mobile telecommunications device.

Since cell phones may have small screens and minimal computing power, the screens may be small, both in terms of display area but also in terms of the number of available user input mechanisms.

Figure 7:
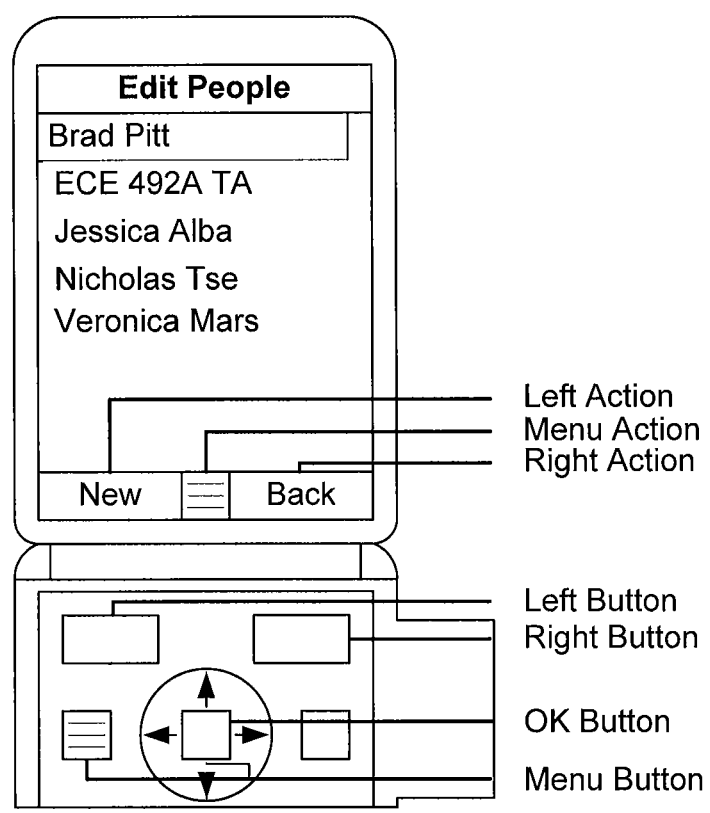
FIG. 7 is an exemplary view of a user input interface and a graphical user interface for a locating device.

FIG. 7 displays a portion of the Motorola i880 emulator. In this embodiment, the phone may be limited to four basic function buttons: the Left, Right, OK, and Menu buttons. A "Left" action may be executed when the Left Button is pressed. Similarly, the "Menu" and "Right" actions may be mapped to the Menu and Right Buttons, respectively. The OK Button may be mapped to yet another action, if applicable to that specific screen (e.g. a "Select" action).

If there are more desired commands, they may be accessible by pressing the Menu button. This built-in Menu functionality may be automatically implemented by the Motorola i880.

In another example, a SE W580i mobile telecommunications device may be used.

FIG. 8 generally lists an example of the mapping of functions to user input buttons, for various main program classes.

Figure 9A:
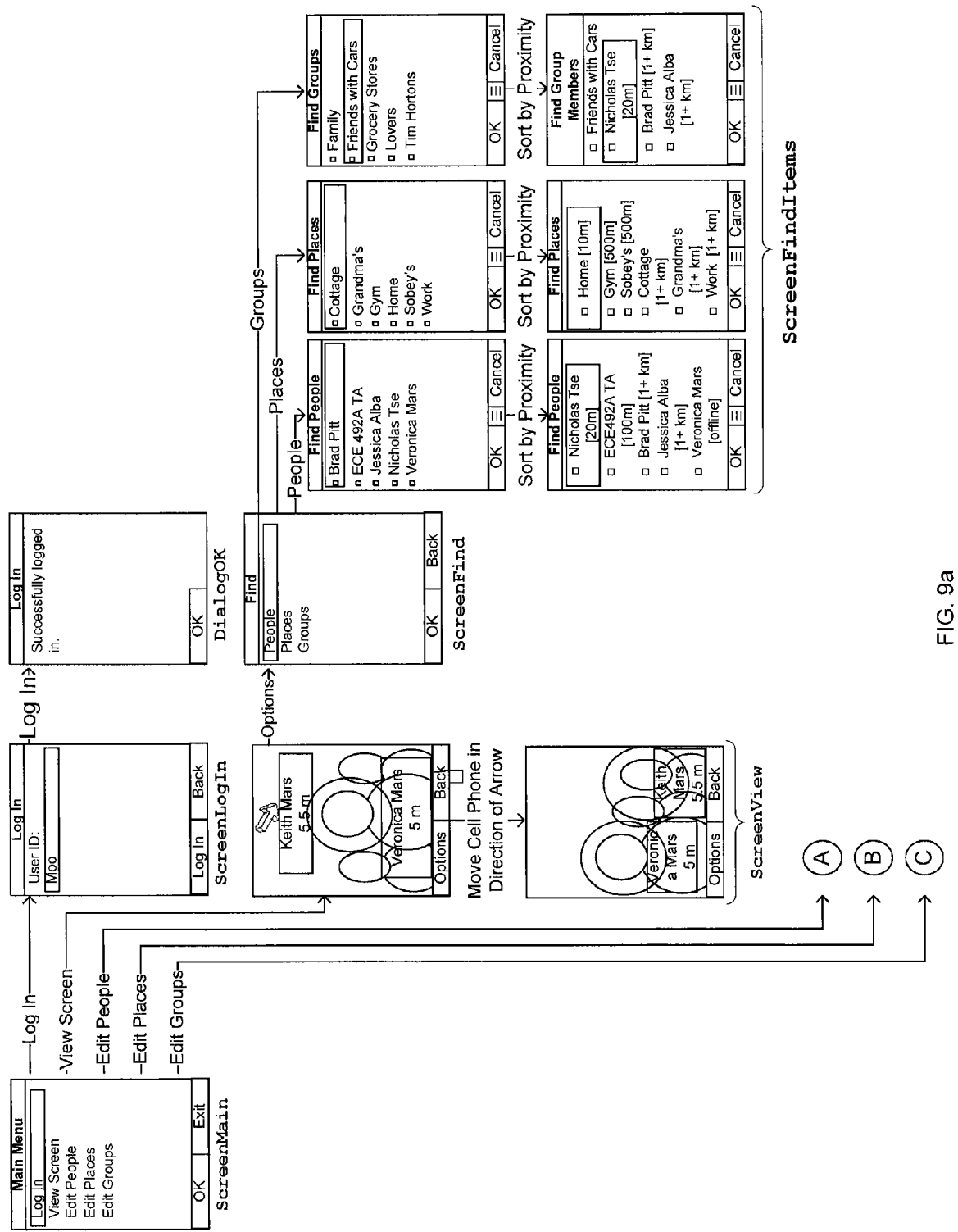
FIGS. 9a and 9b are examples of a visual overview of various display screens on a locating device in one embodiment.
Figure 9B:
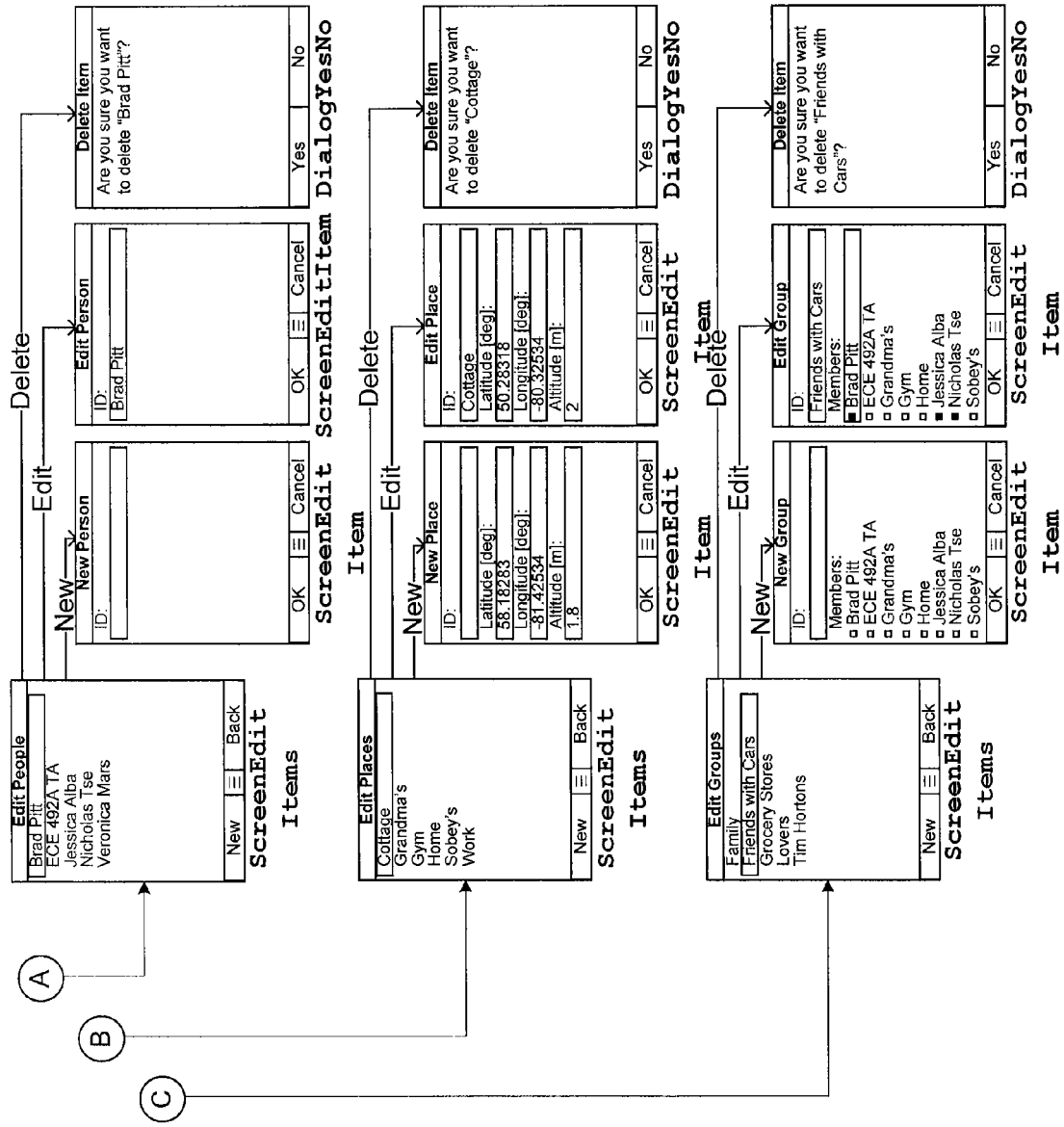
Figure 12:
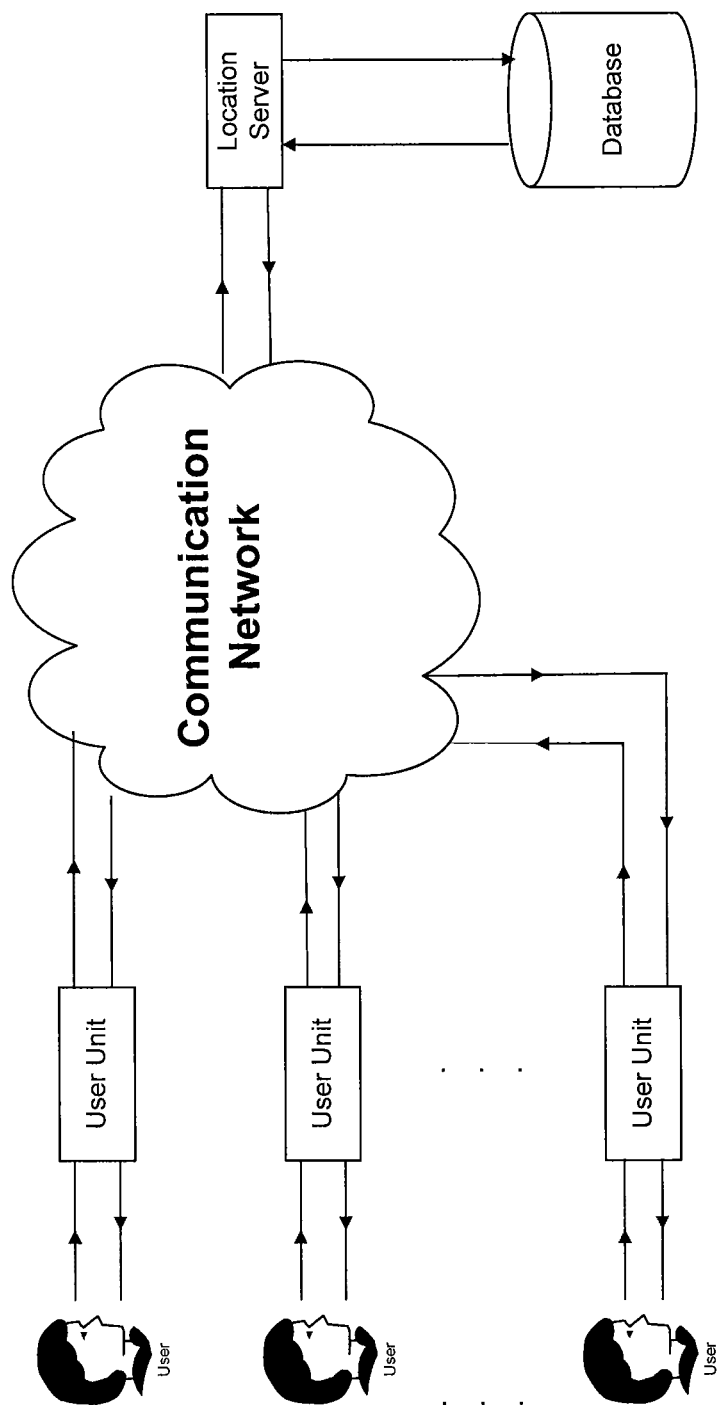
FIG. 12 is a block diagram of a system for delivery of location-oriented information according to one embodiment.

FIGS. 9a and 9b illustrate examples of a visual overview of the screens that may be involved. The arrows in FIGS. 9a and 9b generally indicate an action that the user may take by pressing a button on the phone. The text directly underneath each screen may represent the corresponding Java class in the design. In some embodiments, the screens may be developed using MIDP 2.0 (JSR 118).

In order to determine the response and performance of the 3D graphics algorithm, a test sequence may be developed to generate the relative distance and angle information for situations encountered while using the system described the embodiments above. Referring generally to FIG. 10, a summary of the input data format, size, and description of the input test data is shown. These parameters may be used to determine a position of the target on an captured image. The test cases may be separated into three main categories.

One of the categories is when the target is very close to the object. This may be classified as when the object is within 0.02 m (which may be the finest available precision of the GPS measurement) of the user in the North, South, East, or West directions, and when the user's phone has small heading, roll, and pitch angles (the finest precision may be 0.1° depending on the device chosen).

Another category is when the target is at a reasonable distance from the locating device. For example, reasonable distances may be when the target is located at 1 km North, from the locating device at varying increments from 5° up to 60° for each of the maximum value of heading, pitch, and roll, when the target is located at 1 km North, 1.5 km East at varying increments of 5° up to 60° for each of value of heading, pitch, and roll, and when the target is located at 1 km North, 1.5 km East, 200 m Above at varying increments of 5° up to 60° for each value of heading, pitch, and roll.

Another category is when the target is very far from object. This may be classified as when the target is on the other side of the earth or when the curvature of the earth would interfere with locating the object. This may be used to determine if the algorithm generates meaningful data for locations that may be very far away. The circumference of the earth around the equator approximately 40076 km; thus half of that value should generally be the farthest valid relative distance from the user-unit to any object on the earth.

In some examples, there is provided a mobile telecommunications device application that renders location-related information pertaining to target points of interest through an augmented reality interface. More specifically, the target points of interest may include, but are not limited to, people (e.g., friends, family, and pets) and places (e.g., grocery stores and parking spots). The positions of these target points of interest may also be in many forms, e.g., street addresses, as well as longitudinal and latitudinal coordinates.

In some embodiments, it is envisioned that a location server may provide account management and information services to users of locating devices. For example, these features might include ability to keep a list of contacts, and share location data with contacts to track each other. Additionally, the server might facilitate integration of third party sites such as web-based social networking tools(e.g. Facebook) to provide at least some organizing information.

In some embodiments, the system may be used to provide guided tours of amusement parks, parks, zoos, historic sites, museums, or other points of interest. In other embodiments, the locating device might be used to guide passengers to their destinations within transportation hubs such as train stations, bus terminals and airports. In other embodiments, the locating device might be used to track fellow travel companions while inside a park or a part of an escorted tour group.

While the above description includes a number of exemplary embodiments, many modifications, substitutions, changes and equivalents will now occur to those of ordinary skill in the art.

The invention claimed is:

1. An augmented reality guiding system for delivery of location-oriented information, comprising:
   a) a location server;
   b) a database coupled to the location server and configured to store target information relating to target points of interest; and
   c) at least one mobile locating device, each mobile locating device having a positioning module configured to determine location information for that locating device, an imaging module configured to capture at least one image of at least some of a field of vision for that locating device, a spatial orientation detection module that outputs heading, roll, and pitch data to determine spatial information of that locating device, a display module configured to provide visual feedback, and at least one wireless communication module configured to communicate with the location server;
   d) wherein each mobile locating device is configured to be able to receive target information relating to at least one target points of interest from the location server, and based on the target information and the location information and spatial information for that locating device, display the target information relating to the target point of interest by visually augmenting the at least one captured image on the display module; and
   e) wherein at least one of the target points of interest is a mobile object and the at least one mobile locating device is adapted to dynamically locate the mobile object.

2. The system of claim 1, wherein the target information includes at least one of location information indicative of a location of each target point of interest, spatial orientation information indicative of spatial information relating to each target point of interest, permission information for determining whether the target information is accessible or relevant, and grouping information about how each target point of interest is organized.

3. The system of claim 1, wherein at least one of the target points of interest is a mobile locating device.

4. The system of claim 1, wherein each locating device is further configured so that, when a target point of interest is not within the field of vision the visually augmenting of the at least one captured image includes indicating a direction from the locating device to a location of the target point of interest.

5. The system of claim 1, wherein at least one of the target points of interest is non-mobile.

6. The system of claim 1, wherein each locating device is configured to store target information relating to at least one of the target points of interest in a data storage module locally on the locating device.

7. The system of claim 1 wherein each locating device is configured to allow one or more of the target points of interest to be added and stored in at least one of a data storage module and the location server.

8. The system of claim 1 wherein the imaging module, positioning module, spatial orientation detection module, input module, display module, and communication module are integrally coupled.

9. The system of claim 1, wherein the positioning module and spatial orientation detection module are removably coupled to the locating device.

10. The system of claim 9 wherein the positioning module and spatial orientation module are configured to communicate with the input module, display module, and communication module using a wireless interface.

11. A mobile locating device for an augmented-reality guiding system, comprising:
   a) a positioning module configured to determine a location information for the locating device;
   b) an imaging module configured to capture at least one image of at least some of a field of vision for the locating device;
   c) a spatial orientation detection module that outputs heading, roll, and pitch data to determine spatial information for the imaging module of the locating device;
   d) a display module configured to provide visual feedback; and
   e) at least one wireless communication module configured to communicate with a location server;
   f) wherein the location server is in communication with a database configured to store target information relating to target points of interest, the mobile locating device is configured to be able to receive target information relating to at least one target points of interest from the location server; and based on the target information and the location information and spatial information for the locating device, display the target information relating to the target point of interest by visually augmenting the at least one captured image on the display module; and
   g) wherein at least one of the target points of interest is a mobile object and the at least one mobile locating device is adapted to dynamically locate the mobile object.

12. The mobile locating device of claim 11, wherein the target information includes at least one of location information indicative of a location of each target point of interest, spatial orientation information indicative of spatial information relating to each target point of interest, permission information for determining whether the target information is accessible or relevant and grouping information about how each target point of interest is organized.

13. The mobile locating device of claim 11, wherein at least one of the target points of interest is another mobile locating device.

14. The mobile locating device of claim 11, wherein each locating device is further configured so that, when a target point of interest is not within the field of vision the visually augmenting of the at least one captured image includes indicating a direction from the locating device to a location of the target point of interest.

15. The mobile locating device of claim 11, wherein at least one of the target points of interest is non-mobile.

16. The mobile locating device of claim 11, wherein the locating device is configured to store target information relating to at least one of the target points of interest in a data storage module locally on the locating device.

17. The mobile locating device of claim 11, wherein the locating device is configured to allow one or more of the target points of interest to be added and stored in at least one of a data storage module and the location server.

18. The mobile locating device of claim 11, wherein the imaging module, positioning module, spatial orientation detection module, input module, display module, and communication module are integrally coupled.

19. The mobile locating device of claim 11, wherein the positioning module and spatial orientation detection module are removably coupled to the locating device.

20. A mobile locating device for an augmented-reality guiding system, comprising:
   a) a positioning module configured to determine a location information for the locating device;
   b) an imaging module configured to capture at least one image of at least some of a field of vision for the locating device;
   c) a spatial orientation detection module that determines spatial information for the imaging module of the locating device;
   d) a display module configured to provide visual feedback; and
   e) at least one wireless communication module configured to communicate with a location server;
   f) wherein the location server is in communication with a database configured to store target information relating to target points of interest, the mobile locating device is configured to be able to receive target information from the location server; and based on the target information and the location information and spatial information for the locating device, dynamically display the target information relating to the target point of interest by visually augmenting the at least one captured image on the display module, wherein at least one of the target points of interest is a mobile object and the at least one mobile locating device is adapted to dynamically locate the mobile object.

* * * * *